United States Patent [19]
Colton et al.

[11] 3,970,799
[45] July 20, 1976

[54] COMMON CONTROL SIGNALING EXTRACTION CIRCUIT

[75] Inventors: John Robert Colton, Freehold; Robert Bruce Heick, Eatontown; Henry Mann, Holmdel, all of N.J.

[73] Assignee: Bell Telephone Laboratories, Incorporated, Murray Hill, N.J.

[22] Filed: Oct. 6, 1975

[21] Appl. No.: 619,813

[52] U.S. Cl. .................. 179/15 BY; 179/15 AF
[51] Int. Cl.[2] ............................. H04J 3/12
[58] Field of Search ....... 179/15 BY, 15 AF, 15 BS, 179/15 A; 178/69.5 R

[56] References Cited
UNITED STATES PATENTS

| | | | |
|---|---|---|---|
| 3,166,734 | 1/1965 | Helfrich | 340/147 R |
| 3,401,235 | 9/1968 | Corbin | 179/18 J |
| 3,796,835 | 3/1974 | Closs | 179/15 A |
| 3,872,257 | 3/1975 | Bleickardt | 179/15 A |
| 3,909,540 | 9/1975 | Maryscuk | 179/15 BY |
| 3,931,473 | 1/1976 | Ferris | 179/15 BS |

OTHER PUBLICATIONS
*Bell Laboratories Record*, Aug. 1972, pp. 229–233, "The D3 Channel Bank."
*Bell System Technical Journal*, Oct. 1972, pp. 1701–1712, "D2 Channel Bank:" Digtal Functions.
*Bell Laboratories Record*, Sept. 1973, pp. 226–232, "No. 4 Ess—Long Distance Switching for the Future."

*Primary Examiner*—David L. Stewart
*Attorney, Agent, or Firm*—John K. Mullarney

[57] ABSTRACT

A signaling extraction circuit utilizes common control circuitry to carry out the signal extraction function for all of a plurality of time multiplexed, digital data groups (digroups), each of which comprises 24 time division multiplexed, PCM encoded channels. Each digroup uses eight bits for transmitting digital information for each channel, but the eighth bit (D8) is borrowed for signaling purposes in every sixth frame. To identify these signaling digits, signaling frame information is inserted in a digroup bit stream in the framing bit position of every other frame (i.e., the subframes). A signaling subframe pattern store comprising a shared recirculating memory serves to maintain a continuing real time record of the pattern of the signaling framing information for each digroup, as well as a test digroup. When a predetermined pattern has been recorded for a digroup (i.e., a zero subframe bit preceded by a string of exactly three ones, or a one subframe bit preceded by a string of exactly three zeros) a signal bit store is enabled to receive the D8 bits of the signaling frame which follows the recording of said predetermined pattern.

11 Claims, 8 Drawing Figures

MEMORY CELL

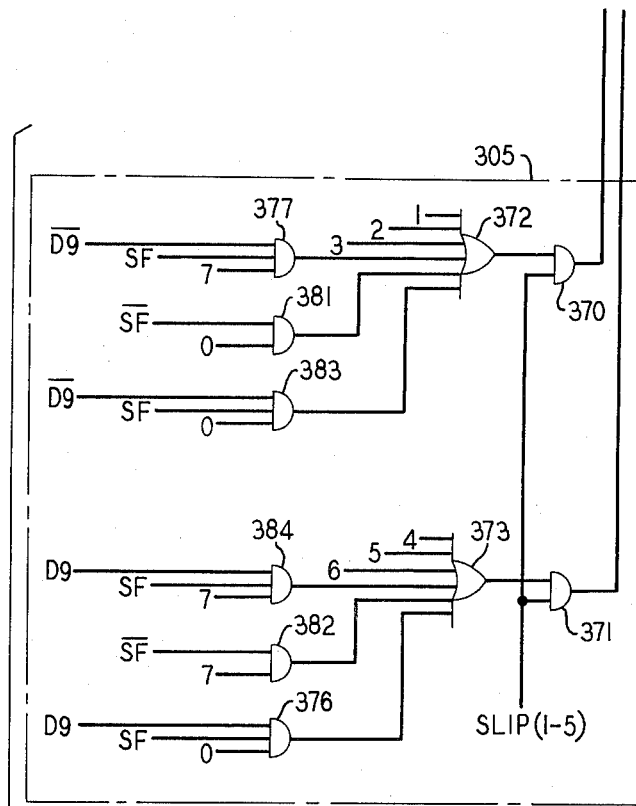
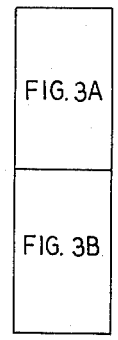
FIG. 3C
FIG. 3A
FIG. 3B
FIG. 3B
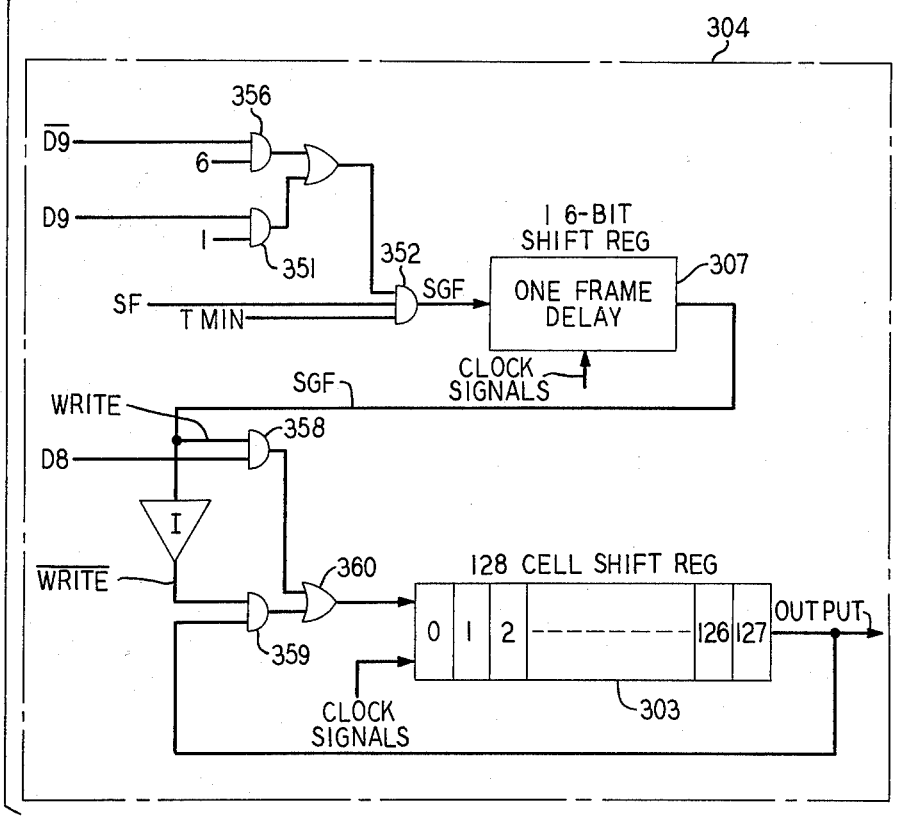

COMMON CONTROL SIGNALING EXTRACTION CIRCUIT

BACKGROUND OF THE INVENTION

This invention relates to a signaling extraction circuit which utilizes common control circuitry to carry out the signal extraction function for each of a plurality of digital groups, of time division multiplexed channels, that are time multiplexed together on to a common transmission link.

In the past, pulse code modulation (PCM) digital data terminals have typically performed the task of signaling extraction, as well as framing detection, reframing, etc., on a per "digroup" basis — a digroup or digital group comprising a plurality of time division multiplexed PCM messages and multiplexed framing and signaling bits; see the article "D2 Channel Bank: Digital Functions" by A. J. Cirillo and D. K. Thovson, *Bell System Technical Journal*, VOl. 51, October 1972, pages 1701–1712, and the references cited therein. The per digroup partitioning of these functions has heretofore resulted in efficient terminal design.

With increasing digital traffic, it is not uncommon now to find proposals for multiplexing a plurality of digroups for transmission to a remote location over a common transmission facility or alternatively for multiplexing a plurality of received digroups on to a common bus at a switching center. These two cases are somewhat analogous and present the same problem with regard to signaling extraction. Conventional practice would suggest carrying out the signal extraction function on a per digroup basis using plural signal extraction circuits to respectively monitor the plurality of digroups. The obvious disadvantage of this approach is, of course, its complexity and costly redundancy in extraction circuitry.

It is accordingly a primary object of the present invention to carry out the signaling extraction function for each of a plurality of time division multiplexed digital groups in accordance with common control techniques.

In the D2 Channel Bank of the above-cited article, as well as in D3, eight bits are used for transmitting digital information (e.g., PCM encoded voice) for each channel in five of every six frames, and the eighth bit (D8) is borrowed for signaling purposes in every sixth frame. To identify these signaling digits, signaling framing information is inserted in the bit stream in the framing bit position of every other frame (i.e., the subframes). The subframe pattern that is used is . . . 111000111000111 . . . The signaling frame is defined as the frame which follows a transition in the subframe pattern. The algorithm used by the D2 and D3 receiving terminals to extract signaling information is to monitor the signaling subframe pattern for a transition (a 1 to 0 or 0 to 1) and to gate the D8 bits to signaling circuitry during the signaling frame that follows each transition. This transition algorithm is quite satisfactory in identifying the signaling frames under normal operating conditions. However, if the subframe pattern is disturbed (e.g., by excessive noise on the transmission line, by changes introduced into a digroup signal by a switching center for synchronization and/or reframe purposes, etc.) the signaling bits may not be properly identified and, as a result, disconnection or wrong number can occur.

It is therefore a further object of the invention to establish more positive or exacting criteria in the identification of signaling frames.

A related object of the invention is to implement a pattern recognition algorithm for the purpose of identifying signaling frames.

No provision is made with the D2 or D3 algorithm to "freeze" the signaling states of the channels during reframing. Instead, these states are allowed to vary randomly between on-hook (i.e., a binary 0) and off-hook (i.e., a binary 1) until framing has been re-established. The D2 - D3 algorithm thus relies upon the relationship between the reframing statistics and the normal office time-out to reduce the probability of disconnection or wrong number during reframing to a tolerable fraction.

It is another object of the invention to further reduce the probability of disconnection or wrong number by freezing the signaling states of the channels, of an out-of-frame digroup, during reframing.

SUMMARY OF THE INVENTION

The signaling extraction circuit of the invention can be advantageously utilized, by way of example, in a large scale, time division switching machine such as the Bell System's No. 4 ESS. The plurality of PCM encoded digital data groups (digroups) transmitted to a No. 4 ESS office are respectively stored a frame at a time and then read out from store in a sequence such that a plurality (5) of x-channel ($x = 24$) digital groups are multiplexed on to a common bus. Each of the incoming digroup bit streams uses eight bits for the transmission of digital information for each channel, but the eighth bit (D8) is borrowed for signaling purposes in every sixth frame. To identify these signaling digits, signaling framing information is inserted in the bit stream in the framing bit position of every other frame (i.e., the subframes).

The signaling extraction circuit of the invention utilizes common control circuitry to carry out the signal extraction function for all of the (plurality of) digroups, as well as a virtual digroup of test time slots, on a time multiplexed basis. A signaling subframe pattern store comprising a shared recirculating memory serves to maintain a continuing real time record of the pattern of the signaling framing information for each digroup, as well as the virtual or test digroup. When a predetermined pattern has been recorded for a digroup (e.g., a zero subframe bit preceded by a string of exactly three ones, or a one subframe bit preceded by a string of exactly three zeros) a signal bit store is enabled to receive the D8 bits of the signaling frame (one-in-six) which follows the recording of said predetermined pattern.

In accordance with the invention, compensation logic is utilized for the purpose of accommodating the signaling extraction circuit to frame/subframe pattern changes which are occasionally introduced into each of the multiplexed digroups by the multiplex system for synchronization purposes. That is, if the multiplex system should add or delete a frame of information (hereinafter designated "slip") for synchronization purposes, the signal extraction circuit is placed in a "limbo" condition, for the respective digroup, from which it exits only in response to the initiation of a new, signaling subframe pattern. While in this latter condition, the read-in of the digroup D8 bits to the signal bit store is prevented.

It is a feature of the invention that the stored signaling states of the channels of a digroup which is (or about to be) out-of-frame are frozen until framing is recaptured.

An advantageous feature of the invention is the facility with which maintenance testing can be carried out. By the use of test time slots, the common control circuitry that is shared by all digroups can be continually tested, while in service, and failures can thus be quickly detected.

A still further feature of the invention is that the common control approach leads to a substantial savings in circuit complexity, and the circuitry is more easily adapted to integrated circuit design.

BRIEF DESCRIPTION OF THE DRAWINGS

The invention will be more fully appreciated from the following detailed description when the same is considered in connection with the accompanying drawings in which:

FIGS. 3A and 3B, when combined as shown in FIG. 3C, show a detailed schematic diagram of the signaling extraction circuit shown in block form in FIG. 1;

DETAILED DESCRIPTION

Figure 1:
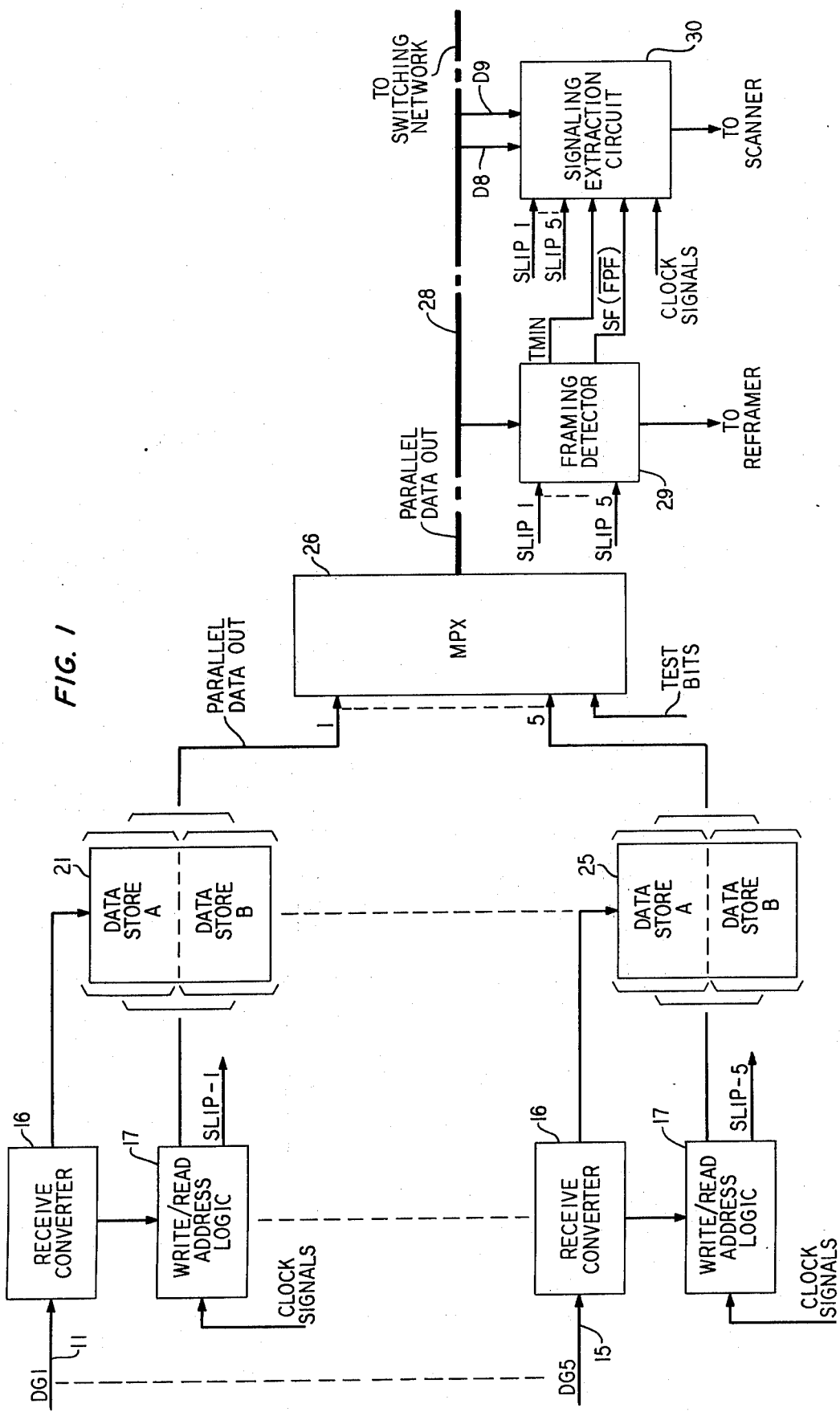
FIG. 1 shows a simplified schematic block diagram of a portion of a time division switching machine incorporating the circuit of the present invention.

Turning now to FIG. 1 of the drawings, there is shown part of a time division switching system that incorporates signaling extraction circuitry in accordance with the invention. For purposes of illustration, the system of FIG. 1 embodies many of the features and aspects of the No. 4 ESS; see the article "No. 4 Ess — Long Distance Switching for the Future" by G. D. Johnson, *Bell Laboratories Record*, September 1973, pages 226–232. It is to be understood, however, that the switching system itself constitutes no part of the present invention and it will be obvious to those in the art that the inventive concepts here disclosed can be used with other and different time division switching systems. And, as heretofore suggested, the present invention can also find use in the analogous situation wherein a plurality of digroups are multiplexed together for transmission to a remote location over a common transmission facility. The incoming transmission line 11 carries a digital group (digroup) of separate and distinct messages in a typical time division multiplexed fashion. Again for purposes of illustration, the data transmitted over line 11 can be assumed to have a format similar to the data format transmitted to a No. 4 ESS office over a T-1 transmission line (see, for example, the article "The D3 Channel Bank" by W. B. Gaunt et al, *Bell Laboratories Record*, August 1972, pages 229–233). This data format is shown in an abbreviated form, in the expanded view of digroup 2, in FIG. 2 (middle) of the drawings. The format consists of twenty-four 8-bit words and one framing bit for a total of 193 bits per frame. The twenty-four worods typically represent twenty-four separate and distinct messages deposited in twenty-four separate and distinct channels 0 – 23. The words are PCM (pulse code modulation) encoded and the least significant bit (i.e., the eighth bit — D8) of a channel is periodically dedicated for signaling purposes. The PCM encoded data words can represent encoded voice or video information, digital data from a data set, etc. As suggested in FIG. 2 (top), and as will be described in detail hereinafter, five working digroups of twenty-four channels each are multiplexed on to a 128 time-slot bus. Of these 128 time-slots or channels, 120 time-slots are utilized for traffic (5 × 24 = 120) and 8 are spares that may be used for maintenance testing and the like.

Figure 2:
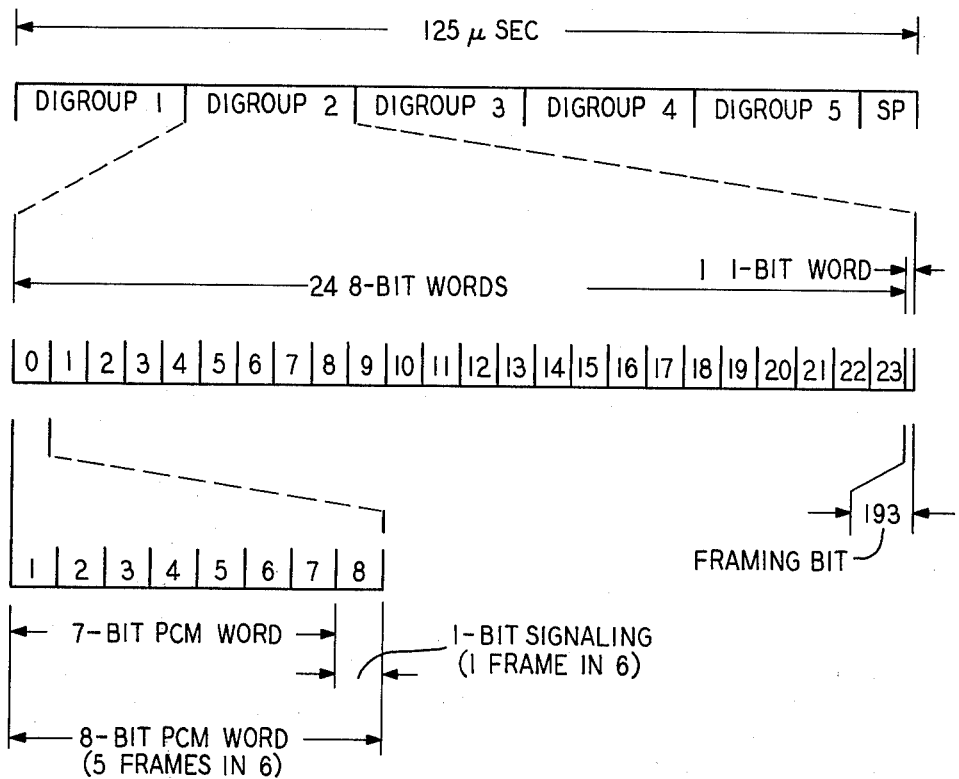
FIG. 2 illustrates the data format of a typical incoming multiplex line.

As shown in FIG. 2 (bottom), all eight bits of a channel are used for carrying message information in five of every six frames, and the eighth bit (D8) is borrowed for signaling purposes in every sixth frame. Each signaling bit of each channel relates only to the signaling information for that particular channel; and, all of the signaling bits of a digroup occur in the same (one-in-six) signaling frame. The borrowed D8 digit of a channel is available for signaling more than 1300 times per second, which is more than adequate to transmit both dial pulses and the requisite supervisory information (e.g., telephone receiver off-hook or on-hook). As pointed out in the above-cited article by W. B. Gaunt et al, the use of this format results in a substantial improvement in transmission (voice) quality.

Each of the incoming T1 transmission lines 11–15, of FIG. 1, transmits framing information in the 193rd pulse position of every other frame. Thus, the framing pattern which results is as follows: —1—x—0—x- —1—x—0—x—1—x. The alternating 1 and 0 bits are, of course, the valid framing bits. The frames which do not contain valid framing bits are called signaling subframes and the 193rd bits of these frames are used to send signaling framing information.

For present purposes, the framing pattern itself is of little consequence and can be disregarded. The signaling subframe pattern is, however, of particular significance to the following description and this pattern is as follows:    —1—x—1—x—1—x—0—x—0—x—0—x- —1—x—1—. Each entry above (—1, —0, —x) represents a frame for a given digroup, and the x's here represent "don't cares" as far as the signaling extraction circuitry is concerned (they are, in fact, the framing pattern bits previously described as successively alternating between 1 and 0). The signaling subframe pattern consists of three 1's alternating with three 0's. The signaling frame (i.e., the frame of D8 signaling bits) of a digroup is the frame that immediately follows a 1 to 0 or 0 to 1 transition in the subframe pattern, it is shown underlined above. As indicated in this signaling pattern supra, a signaling frame occurs every sixth frame.

Each received digroup (DG1–DG5) is delivered to a respective receive converter circuit 16 which includes a clock recovery circuit (not shown) that recovers the line timing of the incoming T1 line and serves to generate coincident clock pulses at the incoming line rate (1.544 MHz). These clock pulses are respectively delivered to each write/read address logic 17. each converter 16 serves to regenerate the received digital bits degraded in transmission, it converts the same from a bipolar to a unipolar format, and it further serves to convert each of the successive digital words (W0 –

W23) to a parallel bit format to permit a parallel write in of the channel bits into the data stores A and B.

The output coincident clock pulses of the converters 16 are serially delivered to the write/read address logic circuits 17 which comprise digit and word counters (not shown). The word counter of each logic circuit 17 counts through twenty-four words and then recycles. Assuming an in-frame situation, this word counter will count from 0 through 23 in time coincidence with the appearance of data words W0 through W23 at the output of the associated receive converter 16. Thus, the word counter indicates the "address" (e.g., the position in the frame) of each data word.

The data stores A and B are each organized as a twenty-four word by 10 bits per word random access memory. When a digroup is in frame, the A and B data stores each store a complete frame of data including the framing bit (D9), plus a parity bit for each channel of the frame. Successive frames of incoming data are alternately written into the A and B stores, with the successive data words in a frame written into successive storage locations as the write address successively increments from 0 to 23. Each receive data store comprises a static MOS (metal oxide semiconductor) store with random access memory and conventional address decoding logic.

The line transmission rate is given as 1.544 MHz, there are 193 bits per frame, and the duration of each line frame is 125 microseconds, which is subdivided into channels of 5.18 microseconds each. This frame duration, in turn, establishes the internal frame duration of the switching office at a corresponding 125 microseconds. The office 125 microsecond frame is divided into 128 time periods, referred to herein as time-slots or channels. Five digroups of 24 channels each are multiplexed on to a 128 time-slot bus, in the manner to be described, leaving 8 spare time-slots. These spare time slots are used for maintenance test purposes, e.g., the spare time slots can be used to test the common control signaling extraction circuit while the same is in service operation. Each write cycle or write operation requires an entire frame (125 microseconds). However, since five digroups are multiplexed on to a common bus in the same time duration (125 microseconds), as illustrated in FIG. 2 (top), the read cycle of a given digroup is only about 20 percent of the time required for a write cycle.

Amongst other clock signals, the office clock (not shown) provides generated word code, clock signals that serve to define the 128 time-slots of the office frame. These latter clock signals are delivered to the address logic circuitry 17 which decodes the same and develops successive cycles of twenty-four counts each, with each cycle of twenty-four counts serving to enable a read out of the data from a given one of the data stores 21 through 25. Thus, for example, as the read address logic 17 associated with the first digroup (DG1) increments through a count of 0 through 23, a frame of data in either store A or store B of data store 21 is read out; for the next cycle of twenty-four counts (24 through 47) a frame of data of digroup DG2 is read out, ... and for the last cycle of twenty-four counts (96 – 119), a frame of data in either store A or B of data store 25 is read. After five successive count cycles of twenty-four counts each, the operation is interrupted for a period of eight time-slots (i.e., time-slots 120 – 127 which are spares) and then it repeats.

The read address signal developed by each logic circuit 17 includes an RA/RB signal (read A/read B) which serves to alternately enable the read out from stores A and B for a given digroup. More specifically, the square waveform of each RA/RB signal is such that data is typically read out of stores A and B in an alternate fashion and read out is generally phase shifted with respect to write such that the read out of one store (A) occurs simultaneously with the write into the other (B), and vice versa.

The recovered line timing used to write the data stores for a given line is typically not synchronized to the office timing used to read these stores and consequently more or less information can be written into the stores than is read out of them. A slip control circuit (not shown), which is part of each address logic 17, deals with this problem by either discarding a frame of stored data or double-reading a frame of stored data, depending upon the relative drift between the read and write cycles. More specifically, if a given recovered line frequency used to write a pair of data stores A and B is greater than the office frequency used to read these stores, the slip control operates on the read cycle to cause a deletion of a frame of data (i.e., a frame of data is discarded). Alternatively, if the recovered line frequency is somewhat less than the office frequency, the slip control operates on the read cycle to cause a double-reading of a frame of data (i.e., a frame of data is repeated). A frame deletion or repetition is termed "slip" and the determination of this slip or drift, as well as the direction thereof, is accomplished by comparing the read and write cycles for a digroup. A slip operation is indicated by a signal on the slip output lead of a respective address logic circuit 17.

The described slip operation achieves synchronization at a switching office, in an essentially asynchronous communication network, with a minimal of resultant impairment to the transmitted signals. A frame of multiplexed data comprises a plurality of distinct message words in distinct multiplexed channels of the frame and therefore one occasional lost or duplicated digital word per message is not significant. Because the network clocks of the distinct offices are more-or-less synchronous, the frequency of a frame deletion or double-reading is small and it is always exactly one frame of data that is affected.

As the read address logic circuitry 17 successively increments through five cycles of twenty-four counts each, the data stores of five digroups are read in succession and the digroups time multiplexed together in multiplexer 26 to form a multiplexed bit stream as depicted in FIG. 2 (top). Thus, the 24 channels of digroup DG1 are read, then the 24 channels of digroup DG2, and so on for the other three digroups. The eight spare time slots (SP) separate the data of channel 23 of digroup DG5 from channel 0 off digroup DG1. The data words are read out of store in a parallel format and they remain in a parallel format on the common bus 28. The circuitry that is recited above, and that is further shown in block form in FIG. 1, is disclosed in detail in U.S. Pat. No. 3,867,579, issued Feb. 18, 1975 to J. R. Colton and H. Mann.

The time division multiplexed digital data groups are delivered to a switching network (not shown) over the common multiplex bus 28. The framing detector 29 continually and independently monitors, at the multiplex point, all of the digital groups (and the test digroup) on a time multiplexed basis. Briefly, the framing detector 29 examines each digroup for frame synchronization by comparing the framing bits thereof against a locally generated framing pattern. If the comparison is successful, the digroup is in-frame and no corrective action need be taken. If the comparison fails, however, an out-of-frame condition is indicated and a "hunting" procedure is initiated by sending an appropriate signal to a reframer. The framing detector 29 is disclosed in detail in U.S. Pat. No. 3,903,371, issued Sept. 2, 1975 to J. R. Colton-R. B. Heick-H. Mann.

The framing detector 29 generates a pair of signals which are of use to the signaling extraction circuit 30 of the present invention. A framing pulse frame signal (FPF) is developed by detector 29 for the purpose of distinguishing those frames of a digroup which include framing bits from those frames (i.e., signaling subframes) which do not. Thus, the signaling subframes (SF) are, by definition, those frames that are not framing pulse frames (i.e., SF = $\overline{FPF}$). It is this latter signal (FPF or SF) that is of use to the signaling extraction circuit 30 in the identification of signaling subframes.

The framing detector 29 includes an error timing store which generates a TMIN signal that is indicative of the fact that the error count of the timing store is zero for a given digroup, i.e., the digroup is in-frame. When framing is lost, either momentarily or longer, the error count increments toward TMAX; TMAX is indicative of the fact that a given digroup is out-of-frame. Thus, the earliest indication of a possible framing loss is the movement of the error timing store from the TMIN state. This TMIN signal is utilized by the signal extraction circuit 30, and in the manner to be described, to freeze the stored signaling states of the channels of a digroup which is (or about to be) out-of-frame A frame deletion or double-reading (i.e., a slip) will perturb the framing/signaling framing bit stream and must be accounted for in the signaling extraction circuit 30, as well as in other circuitry (e.g., the framing detector) of the switching system. To this end, the slip signals (SLIIP-1 . . . SLIP-5) generated by the respective address logic circuits 17 are coupled to the extraction circuit 30, where they are used in the manner to be described.

The interleaved framing and signaling framing bits, in the 193rd bit position of each frame, are written into the data store in the same storage location (row) as the data bits D1 – D8 of data word W23. For this reason, it is convenient to consider the 193rd bit as part of the last word (W23) of a frame and thus to designate the same as D9. The D9 bit stream, output lead of the parallel data output bus 28 is hard-wire connected to the signaling extraction circuit 30. The D8 bit stream, output lead is similarly connected to extraction circuit 30.

The signaling bit output of the signal extraction circuit 30 is delivered to a scanner (not shown) along with the signaling output of a plurality of other extraction circuits. The scanner sequentially scans the input signaling data and thence delivers the same in a multiplexed fashion to a signaling processor which utilizes the same to set-up (and take-down) calls through the switching office.

Figure 3A:
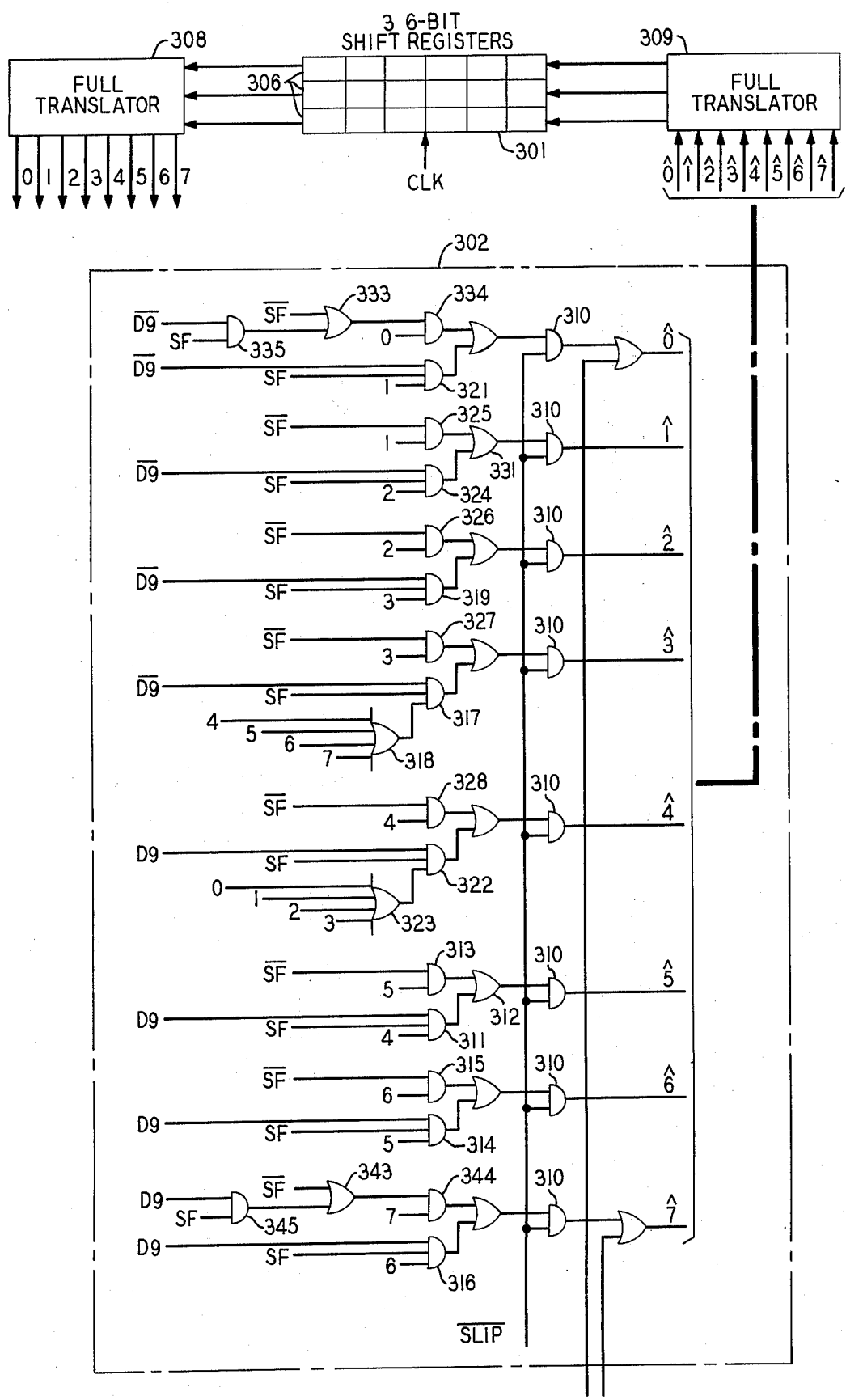

The common control signaling extraction circuit of the invention is shown in detail in FIGS. 3A and B of the drawings. The extraction circuit comprises an 8-state sequential machine which monitors the received subframe pattern for each of the five working digroups and the test digroup to determine the location of a signaling frame, and when such a frame is located for a digroup a command is issued to signal bit storage means to update the signaling bits for that digroup.

A continuing real time record of the signaling subframe pattern for each digroup is stored in a shared recirculating memory, which is continually updated in accordance with changes occurring in each received subframe pattern. This operation is carried out by the subframe pattern store 301 which is comprised of three 6-bit shift registers, that provide the requisite memory, and the update logic 302, which updates or alters the stored subframe pattern information for each digroup in accordance with changes in each received subframe pattern. When a predetermined subframe pattern for a given digroup has been received a 128 cell, shift register 303 (FIG. 3B) is enabled, by the logic circuitry of the signal bit store 304, to receive the D8 bits of the signaling frame which follows the reception of a predetermined subframe pattern. To store the twenty-four D8 bits of each of five working digroups and the eight D8 bits of the test digroup, the storage shift register 303 must consist of at least 128 storage cells.

With the occurrence of a slip condition (a frame deletion or repetition) for a given digroup, the slip inhibit logic 305 serves to alter the data stored in the subframe pattern store 301 so that the read-in of the digroup D8 bits to the signal bit store register 303 is temporarily prevented.

As will be more evident hereinafter, the signaling subframe pattern of a received digroup can be defined as being in one of eight possible states at a given point in time. The subframe pattern store 301 provides a real time record of the state of each received subframe pattern, as well as the pattern of the test digroup. Three binary digits are required to store or record these eight possible states and therefore the pattern store 301 consists of three parallel shift registers 306. At any point in time, the corresponding cells of registers 306 will temporarily store the (1-in-8) state of the subframe pattern of a given digroup. Also, to store the subframe pattern information for all 5 digroups, as well as the test digroup, the three shift registers 306 are required to be of 6-bit length. The shift registers 306 are shifted by clock (CLK) signals derived from the office clock and which shift the stored data at the beginning of time-slots 0, 24, 48, 72, 96 and 120. Thus, for example, at the beginning of time-slot 0 of the office cycle or frame, the binary coded (1-in-8) subframe pattern state of digroup DG1 will appear at the output of the shift registers 306 and the stored states of the other digroups will be advanced one cell position toward the output. The binary coded state of digroup DG1 is translated, updated by the logic circuit 302, and then returned to the input of the registers 306 where it is subsequently advanced or shifted once again toward the register output. At the beginning of time-slot 24 of the office cycle, the binary coded 1-in-8 state of digroup DG2 will be shifted to the output of the shift registers 306 from where it is coupled to the update logic 302. Concurrently therewith, the stored states of the other digroups are each advanced in the registers 306 one cell position. In this fashion, the subframe pattern state data for all of the digroups, including the test digroup, will be continually advanced through the shift registers 306 and then fed back to the input stages thereof via the updated logic 302.

The output fill translator 308 converts the binary coded, shift register output to a one out of eight code; the translator 309 does the reverse, i.e., it performs a decimal to binary type code conversion. Such translators are, of course, well known in the art. To simplify the drawings, air line connections from the translator 308 output to the various logic gate inputs are utilized.

Figure 6:
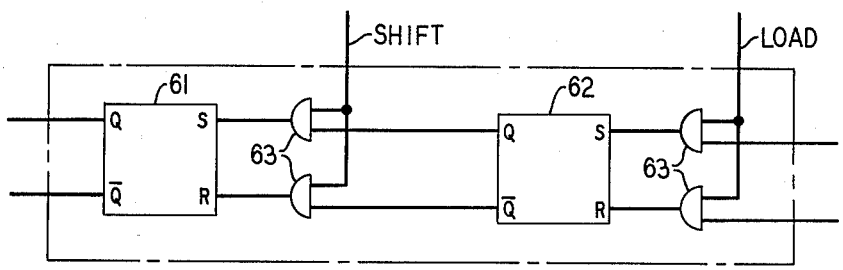
FIG. 6 is a schematic diagram of a single memory cell of which all of the 6-bit shift registers of FIG. 3 are comprised.

The shift registers 306, as well as the one frame delay register 307 of FIG. 3B, are each comprised of six memory cells, with each cell configured as shown in FIG. 6. A typical memory cell consists of a pair of tandem coupled flip-flops 61 and 62 and the clock gate logic 63. A binary data bit is read into the input flip-flop 62 during each of the last, digroup time-slots and the data is shifted from flip-flop 62 to the output flip-flop 621 during each of the first, digroup time-slots. Thus, the shift occurs during time-slots 0, 24, 48, 72, 96 and 120 of the office cycle, while the read in or "load" for each cell occurs during the preceding time-slots 127, 23, 47. 71, 95 and 119 of the office cycle.

Figure 4:
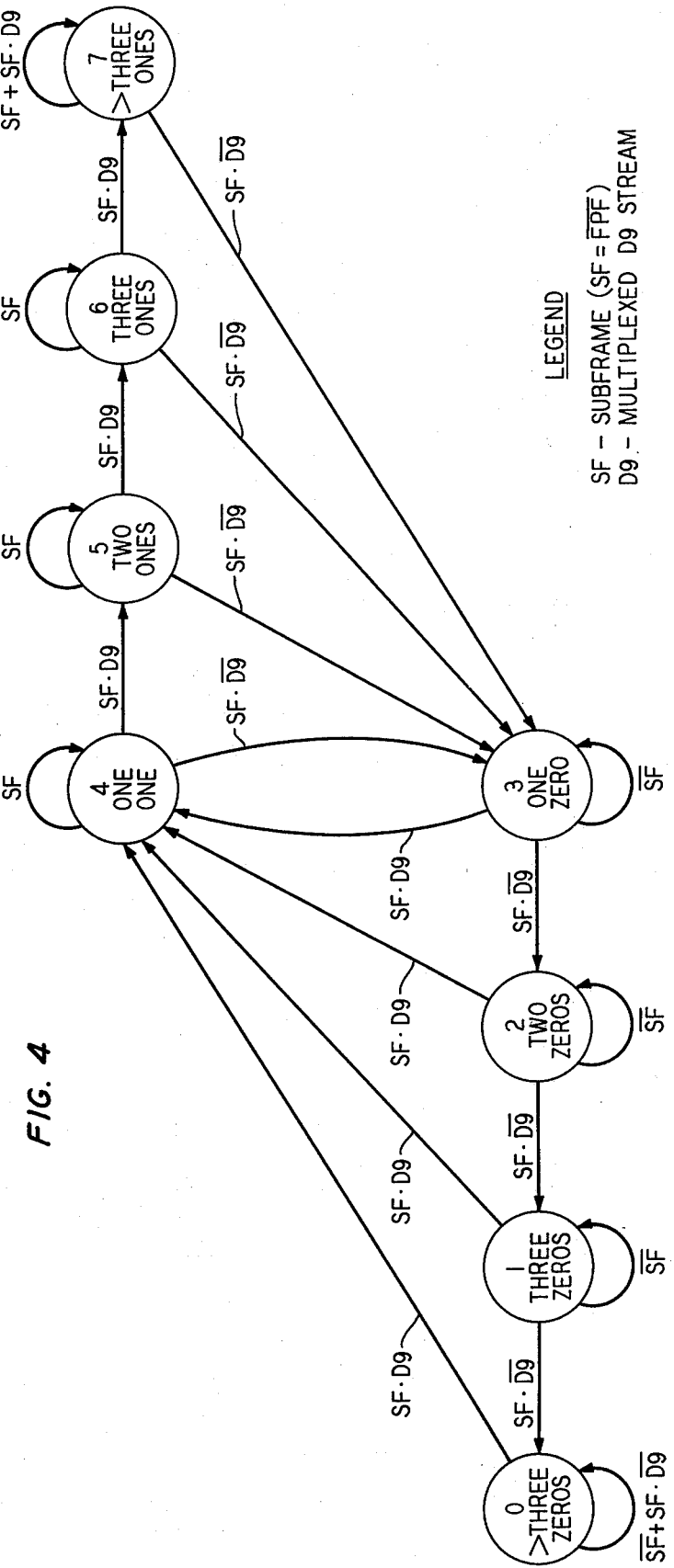
FIG. 4 is a state diagram that is descriptive of the operation of the circuit of FIG. 3 in the absence of slip.

At any given point in time, the subframe pattern status of a given digroup will be in one of eight possible states, as depicted in the state diagram of FIG. 4. State 1 of FIG. 4 is indicative of the fact that three consecutive zeros (D9=0) in the subframe pattern of a digroup have been received, and recorded; state 2 represents the subframe pattern status for the reception of two consecutive zeros; and state 3 represents the temporary status of the signaling subframe pattern when a first zero (D9=0) has been received, and recorded in the manner to be described. State 4 is the state arrived at when a first one (D9=1) in a signaling subframe pattern is received; state 5 represents the subframe pattern status for two consecutive ones; and state 6 is indicative of the fact that three consecutive ones (D9=1) in the signaling subframe pattern have been received and recorded. When a correct signaling subframe pattern is received for a given digroup, and no slip has occurred, the status store routinely sequences through the states 4, 5, 6, 3, 2 and 1, and then recycles. The states of 0 (greater than three zeros) and 7 (greater than three ones) represent aberrations in a received signaling subframe pattern, and will be further discusssed hereinafter.

For purposes of explanation, let it be assumed that the subframe pattern status of a digroup is in a given one of the eight possible states shown in FIG. 4— e.g., assume state 4, which is indicative of the fact that one D9=1 signaling subframe bit has been received. During the next signaling subframe (SF) a second binary one bit (D9=1) will advance the subframe pattern status to state 5; this transition is indicated by the arrow bearing the Boolean expression SF·D9. However, should this next or second subframe bit be a zero (D9=0) the subframe pattern status is instead shifted to state 3; this latter transition is indicated by the arrow labeled SF·$\overline{D9}$ (when D9=0, $\overline{D9}$=1). The transition from state 5 to state 6 takes place with the arrival of the next (third) D9=1 bit during the next signaling subframe (SF·D9). Following the recording of three ones (state 6), the next succeeding signaling subframe bit will normally be a binary zero ($\overline{D9}$=1) and hence the subframe pattern status is shifted to state 3, as indicated by the arrow directed from state 6 to state 3 and labeled SF·$\overline{D9}$. Another zero ($\overline{D9}$) in the subframe pattern results in the transition (SF·$\overline{D9}$) to state 2, and still another zero ($\overline{D9}$) results in the transition (SF·$\overline{D9}$) to state 1. This completes a full cycle of the signaling subframe pattern status, with the cycle being reinitiated upon the arrival of a binary one (D9=1) in the very next signaling subframe (SF). The foregoing represents the normal sequence in the subframe pattern states in the absence of slip or subframe pattern violations.

Subframe pattern violations alter the normal sequence in the following ways. If the subframe pattern status of a digroup is in state 4, 5 or 6 and the next subframe (SF) bit is a binary zero (D9=0, $\overline{D9}$=1) instead of the normal binary one, the subframe pattern status is shifted to state 3, the transitions being designated SF·$\overline{D9}$. Alternatively, if the subframe pattern status of a digroup is in state 1, 2 or 3 and the next SF bit is a binary one (D9=1), instead of the normal binary zero, the subframe pattern status is shifted to state 4, these transitions being designated SF·D9. Should the subframe pattern status of a digroup be in state 6 and the next SF bit be a binary one (i.e., a fourth consecutive D9=1 bit is received), the subframe pattern state is shifted to state 7, where it remains until a zero ($\overline{D9}$) subframe bit is eventually received during a subsequent SF. If the subframe pattern status of a given digroup is in state 1 and the next SF bit is a binary zero (i.e., a fourth consecutive D9<0 bit is received), the subframe pattern state is shifted to state 0, where it remains until a one (D9) subframe bit is received. States 0 and 7 each represent a limbo state or condition for a digroup, from which it exits only in response to the initiation of a new subframe pattern, i.e., the reception of a first one (D9) or zero ($\overline{D9}$), respectively. As will be more evident hereinafter, in this limbo condition the read in of the digroup D8 bits to the signal bit store register 303 is prevented. The closed loops of each state, that are designated SF, indicate that the states are unchanged during framing pulse frames FPF (FPF=$\overline{SF}$); that is, a subframe pattern state is simply recycled through the subframe pattern store 301 during a FPF. For state 0, the Boolean expression $\overline{SF}$+SF·$\overline{D9}$ means simply that the state is unchanged during a framing pulse frame (FPF=$\overline{SF}$) or when the next SF bit is a binary zero ($\overline{D9}$). For state 7, $\overline{SF}$+D9 indicates that the state is unchanged during a framing pulse frame ($\overline{SF}$) or when the next SF bit is a binary one (D9).

FIG. 3A shows the circuit which implements the state diagram of FIG. 4. The framing pattern state output from the shift registers 306 is delivered via the translator 308 to the update logic 302 as a one out of eight code signal (0, 1 . . . or 7). The combinational update logic 302 (i.e., the non-minimal AND/OR gate logic) determines the new subframe pattern state for a digroup based on its prior state and the input signals SF (and $\overline{SF}$) and D9 (and $\overline{D9}$). The circumflexed numerals (i.e., $\hat{0}, \hat{1}$ . . . $\hat{7}$) represent the new subframe pattern state, which normally will be the next state in the heretofore described normal sequence (4, 5, 6, 3, 2 and 1) of subframe pattern states.

FIG. 4 is the operative state diagram for the extraction circuit in the absence of slip; in FIG. 3A, the update logic circuit 302 is functional only during this non-slip ($\overline{SLIP}$) condition. To this end, the $\overline{SLIP}$ signal is delivered to the AND gates 310 to enable the same only when a non-slip condition prevails.

For purposes of explanation, again assume that the subframe pattern status of a given digroup is in a given one of the eight possible states shown in FIG. 4 — e.g., assume state 4. During the next signaling subframe (SF) of the digroup a binary one bit (D9=1) will advance the subframe pattern status to state 5 (in FIG. 3A, $\hat{5}$). This function is performed by AND gate 311, which is enabled by the D9=1 bit during the next signaling subframe (SF=1) if the previous state was state 4. The output of gate 311 is coupled via the OR gate 312 and the enabled (SLIP=1) AND gate 310 to the translator 309. During the following framing pulse frame (FPF=SF=1) the AND gate 313 is enabled to permit the state 5 signal to recirculate, via the OR gate 312 and the enabled (SLIP=1) AND gate 310 coupled in tandem thereto. The next (normal) transition from state 5 to state 6 takes place with the arrival of the next (third) D9=1 bit during the next signaling subframe (SF). This function is performed by the AND gate 314, which is enabled by the D9=1 bit during the subsequent subframe (SF=1) if the previous state was state 5. During the following framing pulse frame ($\overline{SF}$) the AND gate 315 is enabled to permit the state 6 signal to recirculate. With the signaling subframe status of a given digroup thus in state 6, a D9=1 bit (i.e., a fourth consecutive D9 bit) in the next signaling subframe (SF) will serve to enable the AND gate 316 and thereby advance the signaling subframe pattern status to state 7 (in FIG. 3A, 7). However, following the recording of three ones (state 6) the next succeeding signaling subframe bit will normally be a binary zero ($\overline{D9}$=1) and hence the subframe status is normally shifted to state 3 (in FIG. 3A, 3). This function is performed by the AND gate 317, which is enabled by the $\overline{D9}$ bit during the next subframe (SF=1) if the previous state was state 6. The OR gate 318 serves to couple the state 6 signal to the input of the AND gate 317. The OR gate 318 also serves to couple the state 4, 5 and 7 signals to the input of AND gate 317, and hence when a succeeding subframe (SF) bit is a zero ($\overline{D9}$) the AND gate 317 will be similarly enabled to change any given one of these states to state 3 (in FIG. 3A, 3). With the subframe pattern status thus in state 3, the next succeeding signaling subframe (SF) bit $\overline{D9}$ will enable the AND gate 319 to shift the subframe pattern status to state 2 (two consecutive zeros). From state 2 the subframe pattern status is shifted to state 1, if the next succeeding signaling subframe bit is $\overline{D9}$=1, under these conditions the AND gate 324 is enabled to deliver an energizing signal to the 1 lead via the OR gate 331 and the tandem connected AND gate 310. With the subframe pattern status of a digroup in state 1 and the next SF bit a binary zero (i.e., a fourth consecutive D9=0 bit is received), the subframe pattern state is shifted to zero (i.e., $\hat{0}$) by the enabling of AND gate 321; whereas, if this next SF bit is a binary one (D9), the AND gate 322 is enabled to shift the stored status to state 4. In fact, if the signaling subframe state is either state 0, 1, 2 or 3 and the next SF bit is a D9=1 bit the AND gate 322 is enabled to cause a state change to state 4 (i.e., 4). The 0 through 4 state signals are coupled to the input of AND gate 322 via the OR gate 323.

As previously noted, a subframe pattern state is recycled through the subframe pattern store during a framing pulse frame FPF (or $\overline{SF}$). For states 1 through 6 this function is performed by the AND gates 325, 326, 327, 328, 313 and 315, respectively. For example, when $\overline{SF}$=1 the AND gate 325 is enabled to pass the state 1 signal back to the input of status store 301 via the OR gate 331, the tandem connected AND gate 310 and the translator 309. In FIG. 4, the closed loop of state 0 is given by the Boolean expression $\overline{SF}+SF\cdot\overline{D9}$, heretofore explained; the gates 333, 334 and 335 perform the function of this Boolean expression. During a framing pulse frame, the $\overline{SF}$=1 signal is coupled via the OR gate 333 to the AND gate 334 so as to enable the same to pass the state 0 signal that is inputted thereto. Thus, the state 0 signal is unchanged during FPF. Also, with the subframe pattern status of a digroup in state 0 and the next SF bit a zero ($\overline{D9}$), the AND gates 335 and 334 are enabled to permit the recycling of the state 0 signal. The closed loop of state 7 is given by the Boolean expression $\overline{SF}+SF\cdot D9$, previously explained; the gates 343, 344 and 345 perform the function of this Boolean expression. During a framing pulse frame, the $\overline{SF}$=1 signal is coupled via the OR gate 343 to the AND gate 344 so as to enable the same to pass the state 7 signal that is inputted thereto. Thus, the state 7 signal is unchanged during FPF. Also, with the subframe pattern status of a digroup in state 7 and the next SF bit a one (D9), the AND gates 345 and 344 are enabled to permit the recycling of the state 7 signal.

As previously explained, when a predetermined pattern has been received for a given digroup (e.g., a zero subframe bit preceded by a string of exactly three ones, or a one subframe bit preceded by a string of exactly three zeros) the signal bit store 304, and in particular the storage shift register 303, is enabled to receive the D8 bits of the signaling frame which follows said predetermined pattern. Turning to FIG. 3B, when the stored subframe pattern state output is state 1 (three zeros) and a D9=1 bit is received the AND gate 351 is enabled; and when the subframe state output is state 6 (three ones) and a $\overline{D9}$=1 bit is received the AND gate 356 is enabled. Either of these predetermined conditions serves to produce a SGF signal output from AND gate 352 during a signaling subframe (SF=1) if the digroup is in frame (i.e., TMIN=1). This SGF signal is delivered to the delay 307 which serves to delay the same for a period of one frame (125 μs). The one frame delay 307 consists of one 6-bit shift register, which is configured and clocked in exactly the same manner as the shift registers 306. Accordingly it should be understood that this 6-bit register serves to provide the requisite frame delay for the five working digroups, as well as the test digroup.

Now as described supra, the signaling frame (i.e., the frame of D8 signaling bits) of a digroup is the frame that immediately follows a 1 to 0 or 0 to 1 transition in the 111000111000111 . . . subframe pattern. The AND gates 351 and 356 determine when such a transition has occurred for a digroup, and the signaling frame (SGF) output indication from the frame delay 307 is delivered as a write signal to AND gate 358 during the digroup frame that follows such a transition. This SGF (WRITE) signal serves to enable the gate 358 to permit the write in of D8 bits into the 128 cell shift register 303. In the absence of such a write signal (i.e., $\overline{WRITE}$) the AND gate 358 is disabled so as to prevent the D8-bit write in; in this case, the stored (D8) signaling bits are simply recycled via the AND gate 359 and the OR gate 360. The shift register 303 is of conventional design and it is clocked 128 times during each office frame (125 μs).

The earliest indication of a possible framing loss is the movement of the framing detector 29 circuitry from the TMIN state. Thus, when a digroup is (or about to go) out-of-frame the TMIN signal goes to zero and the gate 352 is immediately disabled so as to prevent the generation of an SGF signal. As a result, the AND gate 358 will be similarly disabled during the following frame and the write in of D8 bits to the signal bit store register 303 is prevented. The TMIN signal therefore serves to freeze the stored signaling states (i.e., the D8 bits are recycled) of the channels of a digroup which is (or about to be) out-of-frame.

To summarize the operation of the signal bit store 304: if the subframe pattern status is not in state 6 (three ones) when a zero ($\overline{D9}$) subframe bit is received; if it is not in state 1 (three zeros) when a one (D9) subframe bit is received; of if the framing detector circuitry is not in the TMIN state (indicative of the in-frame condition), the write in of new D8 bits of a digroup is prevented.

Figure 5:
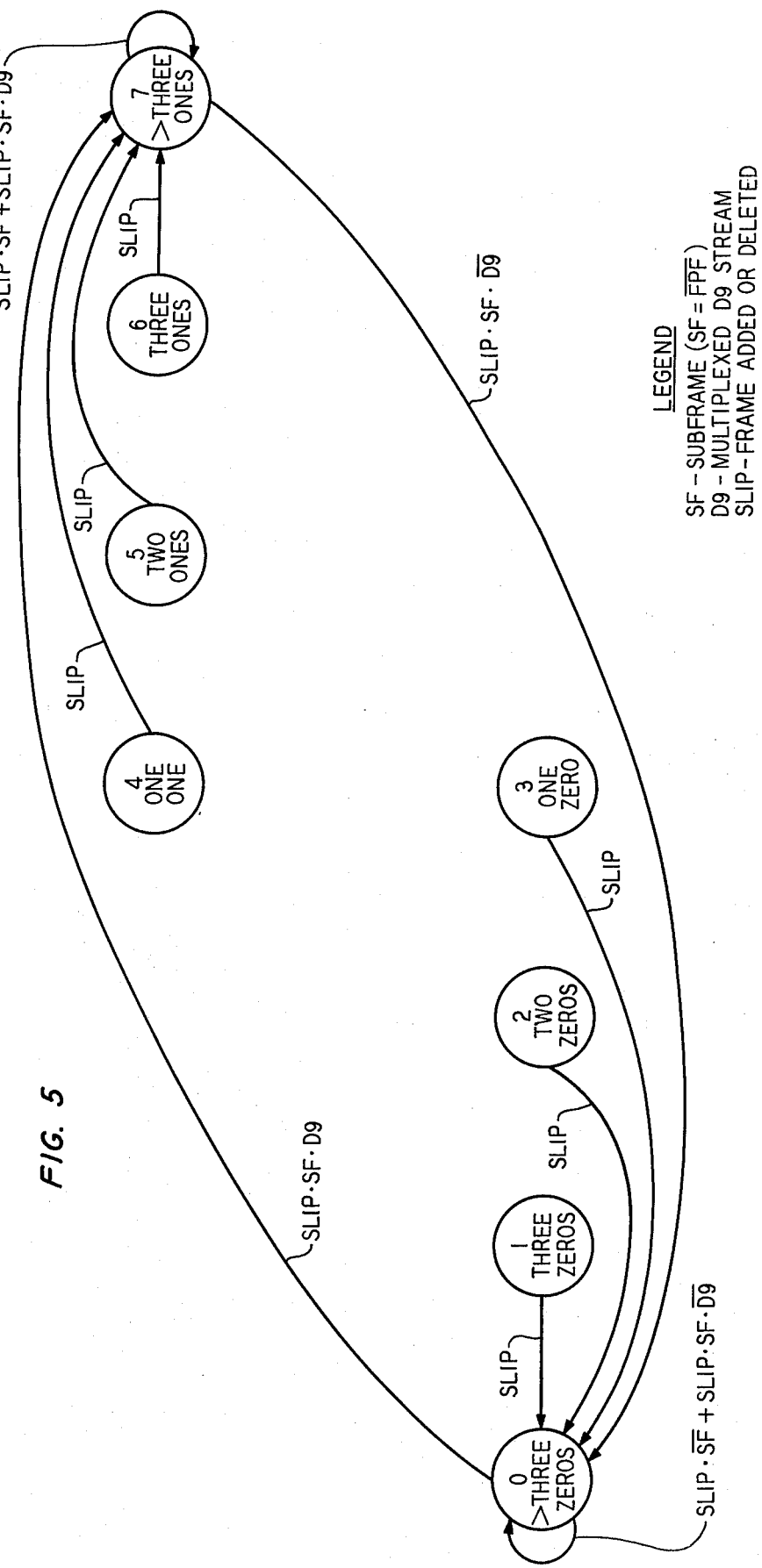
FIG. 5 is a state diagram that is descriptive of the operation of the circuit of FIG. 3 upon the occurrence of slip.

FIG. 5 is a state diagram that describes the operation of the signaling extraction circuit with the occurrence of slip (a frame deletion or frame repetition). The 8 possible states, 0, 1 . . . 7, that define the status of the signaling subframe pattern of a digroup are the same as those of FIG. 4 heretofore described. Now if a SLIP signal is generated for a given digroup with the subframe pattern status in state 1, 2 or 3, the state is shifted to state 0, and if the subframe pattern status is in either state 4, 5 or 6, the state is shifted to state 7. With the subframe pattern status assumed to be state 7 (four or more consecutive D9=1 bits) a transition to state 0 occurs if a SLIP signal is generated during a signaling subframe (SF) and the D9 bit is a binary zero (i.e., $\overline{D9}$=1). This transition is indicated by the arrow labeled SLIP·SF·$\overline{D9}$. Alternatively, with the subframe pattern status assumed to be state 0 (four or more consecutive D9=0 bits) a transition to state 7 occurs if a SLIP signal is generated during a signaling subframe (SF) and the D9 bit is a binary one; this latter transition is indicated by the arrow labeled SLIP·SF·D9.

For state 0, the closed loop designated by the Boolean expression SLIP·$\overline{SF}$+SLIP·SF·$\overline{D9}$ means simply that the state is unchanged if a SLIP occurs during the framing pulse frame (FPF=$\overline{SF}$) of a given digroup, or if a SLIP occurs during the next signaling subframe (SF) and the D9 bit is a zero ($\overline{D9}$). For state 7, the closed loop designated by the Boolean expression SLIP·$\overline{SF}$+λ SLIP·SF·D9 means that the state is unchanged if a slip occurs during a framing pulse frame ($\overline{SF}$) or when a slip signal is generated during the next SF and D9=1.

The state diagrams of FIGS. 4 and 5, taken together, are descriptive of the overall operation of the signal extraction circuit of the invention. For simplicity in presentation, however, the slip and non-slip conditions have been treated separately herein.

The slip logic circuitry 305 of FIG. 3B serves to implement the slip state diagram of FIG. 5. To this end, each digroup SLIP signal is delivered to the AND gates 370 and 371 to enable the same only when a slip condition prevails. Now if the signaling subframe state of a given digroup is in either state 1, 2 or 3 and a SLIP signal occurs, the state is changed to state 0 (in FIG. 3A, 0). This function is quite obviously provided by the OR gate 372 and the AND gate 370. With the signaling subframe state of a given digroup in eigher state 4, 5 or 6, a SLIP signal causes a transition to state 7 (7). The OR gate 373 and AND gate 371 provide this latter function. With the subframe pattern status of a digroup in state 0 and the next signaling subframe bit (SF) a binary one (D9=1), the AND gate 376 will be enabled and the state changed to state 7 (or 7) if a SLIP signal is present at the input of AND gate 371. Whereas, if the subframe pattern status of a digroup is in state 7 and the next SF bit is a binary zero ($\overline{D9}$), the AND gate 377 will be enabled and result in a change to state 0 if a SLIP signal is concurrently presented to gate 370.

In FIG. 5, the closed loop of state 0 is given by the Boolean expression SLIP·$\overline{SF}$+SLIP·SF·$\overline{D9}$, heretofore described; the gates 370, 372, 381 and 383 perform the function recited by the Boolean expression. Thus, with the status of a given digroup in state 0, the $\overline{SF}$=1 signal is passed by the enabled AND gate 381 and tandem OR gate 372 to the AND gate 370 which is enabled by a concurrent SLIP input. The state 0 is therefore unchanged during FPF. Also, with (1) the subframe pattern status of a digroup in state 0; (2) the next SF bit a binary zero ($\overline{D9}$); and (3) the concurrent presence of a SLIP signal at the input of gate 370, the AND gates 383 and 370 will be enabled to permit the recycling of the state 0 signal. The closed loop of state 7 is given by the Boolean expression SLIP·$\overline{SF}$+SLIP·SF·D9, heretofore described; the gates 371, 373, 382 and 384 perform the recited function of the Boolean expression. Thus, with the status of a given digroup in state 7, the $\overline{SF}$=1 signal is passed by the enabled AND gate 382 and OR gate 373 to the AND gate 371 which is enabled by a concurrent SLIP input. The state 7 is therefore unchanged during a framing pulse frame FPF. Also, with (1) the subframe pattern status of a digroup in state 7; (2) the next SF bit a D9; and (3) the concurrent presence of a SLIP signal at the input of gate 371, the AND gates 384 and 371 will be enabled to permit the recycling of the state 7 signal.

To conclude, if the switching machine should delete or repeat a frame of information (SLIP), the signal extraction circuit is placed in either state 0 to 7 (FIG. 5), for the respective digroup, from which it exits only in response to the initiation of a new, signaling subframe pattern. While in either of the 0 or 7 states or conditions, the write in of the digroup D8 bits to the signal bit store is prevented.

It is a particular advantage, realized in the common control signaling extraction circuit of the invention, that maintenance testing can be carried out with great facility. For example, a test vector (i.e., D8 test signaling bits and a test D9 bit) can be inserted in the time slots of the test digroup and the performance of the common control circuitry thereby monitored at selected points while in service operation. The test vector is inserted at the multiplex point by strobing, for example, the bits stored in a ROM (read only memory). The test bits can, of course, also be inserted under a central processor control. It will be further evident that test bits can be provided to simulate slip, cause an apparent out-of-frame condition in the test digroup, etc. The common control circuitry is monitored at selected points (e.g., the binary output of the full translator 309, the write signal input to AND gate 358, etc.) and failures can thus be quickly detected and isolated. And, importantly, these maintenance procedures can be continuously carried out with the equipment in normal service operation.

The invention as described herein is useful in a transmission/switching system wherein n-bits (n=8) are used for transmitting digital information for each channel of a plurality (5) of multichannel (24) digital groups, with the nth bit borrowed for signaling purposes in each mth (m=6) frame. Also, as described, each digital group includes signaling subframe bits in a predetermined position (i.e., the framing bit position) of every fth (2nd) frame for the purpose of identifying the signaling bits of the group. It should be evident, however, that the signal extraction circuit of the invention is equally applicable to other and different systems wherein n, m, and $f$ supra comprise other and different numerical combinations and permutations. Similarly, the principles of the invention are applicable to systems wherein a greater, or lesser, number of digital groups are time multiplexed together, with each digital group having more, or less, than 24 channels.

The above described arrangement is considered to be merely illustrative of the application of the principles of the present invention and numerous variations and modifications thereof may be devised by those skilled in the art without departing from the spirit and scope of the invention.

What is claimed is:

1. In a time division multiplex system wherein a plurality of digital groups of time division multiplexed channels are time multiplexed together on to a transmission link, each digital group including a similar predetermined framing bit pattern, each digital group using $n$-bits for transmitting digital information for each channel with the $n$th bit borrowed for signaling purposes in every $m$th frame, each digital group also including signaling framing bits in a given bit position of every $f$ frames for the purpose of identifying the signaling bits of the group; a signaling extraction circuit characterized by signaling framing pattern store means including a shared recirculating memory for maintaining a continuing real time record of the pattern of the signaling framing bits for each digital group, a signal bit storage means for storing the $n$th signaling bit of each channel of each digital group, and means for enabling the signal bit storage means to receive the $n$th signaling bit of each chananel of a digital group after a predetermined signaling framing bit pattern has been recorded for the group.

2. A signaling extraction circuit as defined in claim 1 including means for freezing the stored signaling bits of the channels of a digital group which is or about to be out-of-frame.

3. A signaling extraction circuit as defined in claim 1 including means for preventing the write in of the signaling bits of a digital group into the signal bit storage means when a frame deletion or repetition in the digital group signal is produced by the multiplex system, said write in being prevented until such time as a new predetermined signaling framing bit pattern has been recorded for the group.

4. A signaling extraction circuit as defined in claim 1 wherein the shared recirculating memory comprises a plurality of parallel shift registers that are clocked in time coincidence with the appearance of the digital groups on the multiplexed transmission link.

5. A signaling extraction circuit as defined in claim 4 wherein each of the shift registers comprises a number of cells that exceed by one the number of multiplex digital groups.

6. A time division system as defined in claim 1 wherein $n = 8$ and the least significant bit of each channel is periodically borrowed for signaling purposes.

7. A time division system as defined in claim 6 wherein $m = 6$ and $f = 2$, with the signaling framing bits positioned in the framing bit location of every other frame.

8. A signaling extraction circuit as defined in claim 1 wherein the signal bit storage means comprises a shared recirculating memory with a capacity to store the signaling bits of a signaling frame for each of the plurality of digital groups.

9. In a time division switching system wherein a plurality of digital groups of time division multiplexed channels are time multiplexed together on to a common bus, each digital group including a similar predetermined framing bit pattern, each digital group using $n$-bits for transmitting digital information for each channel with the least significant bit of each channel borrowed for signaling purposes in every $m$th frame, each digital group also including a predetermined pattern of signaling framing bits disposed in the framing bit positions of every other frame for the purpose of identifying the signaling bits of the group, a signaling extraction circuit comprising signaling framing pattern store means coupled to the common bus and including a shared recirculating memory for maintaining a continuing real time record of the pattern of the signaling framing bits for each digital group, signaling bit storage means including a shared recirculating memory with a capacity to store the signaling bits of a $m$th frame for each of the plurality of digital groups, and gating means coupled to said pattern store means for enabling the signaling bit storage means to receive the signaling bits of the channels of a digital group after a predetermined signaling framing bit pattern has been recorded for the group, said gating means further serving to freeze the stored signaling bits of the channels of a digital group during an out-of-frame condition of the same.

10. A signaling extraction circuit as defined in claim 9 including means for preventing the write in of the signaling bits of a digital group into the signaling bit storage means when a frame deletion or repetition in the digital group signal is produced by the multiplex system, said write in being prevented until such time as a new predetermined signaling framing bit pattern has been recorded for the group.

11. In a time division multiplex system wherein a plurality of digital groups of time division multiplexed channels are time multiplexed together on to a transmission link, each digital group including a similar predetermined framing bit pattern, each digital group using $n$-bits for transmitting digital information for each channel with the $n$th bit borrowed for signaling purposes in every $m$th frame, each digital group also including signaling framing bits in a given bit position of every $f$ frames for the purpose of identifying the signaling bits of the group; a signaling extraction circuit characterized by signaling framing pattern store means for maintaining a continuing real time record of the pattern of the signaling framing bits for each digital group, a signal bit storage means for storing the $n$th signaling bit of each channel of each digital group, and means for enabling the signal bit storage means to receive the $n$th signaling bit of each channel of a digital group after a predetermined signaling framing bit pattern has been recorded for the group.

* * * * *

UNITED STATES PATENT AND TRADEMARK OFFICE
CERTIFICATE OF CORRECTION

PATENT NO. : 3,970,799
DATED : July 20, 1976
INVENTOR(S) : John R. Colton, Robert B. Heick and Henry Mann It is certified that error appears in the above-identified patent and that said Letters Patent are hereby corrected as shown below:

In the Abstract, line 9, "frame" should read --framing--. Column 4, line 1, "worods" should read --words--; line 44, "-1-x-1-x-1-x-0-x-0-x-0-x-1-x-1" should read -- -1-x-1-x-1-x-0-x-0-x-0-x-1-x-1 --; line 64, after the period "each" should read --Each--. Column 6, line 56, "off" should read --of--. Column 7, line 40, "SLIIP" should read --SLIP--. Column 9, line 13, "621" should read --61--; line 17, after "47" delete the period and insert a comma. Column 10, line 21, "D9<0" should read --D9=0--; line 31, "SF" should read --$\overline{SF}$--; line 38, "SF+D9" should read -- $\overline{SF}$+SF·D9 --. Column 13, line 7, "of" should read --or--; lines 39 and 40, "SLIP·$\overline{SF}$+λSLIP·SF·D9" should read --SLIP·$\overline{SF}$+SLIP·SF·D9--; line 57, "eigher" should read --either--. Column 14, line 30, "to" should read --or--.

Signed and Sealed this

Eleventh Day of January 1977

[SEAL]

Attest:

RUTH C. MASON
*Attesting Officer*

C. MARSHALL DANN
*Commissioner of Patents and Trademarks*